United States Patent
Cuddihy et al.

(10) Patent No.: US 9,358,953 B2
(45) Date of Patent: Jun. 7, 2016

(54) SEAT BELT PRESENTER FAULT INDICATION

(71) Applicant: Ford Global Technologies, LLC, Dearborn, MI (US)

(72) Inventors: Mark A. Cuddihy, New Boston, MI (US); Brian Robert Spahn, Plymouth, MI (US); Edward Joseph DeSmet, Canton, MI (US); Benjamin Yilma, Canton, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 0 days.

(21) Appl. No.: 14/535,360

(22) Filed: Nov. 7, 2014

(65) Prior Publication Data

US 2016/0129880 A1    May 12, 2016

(51) Int. Cl.
*B60Q 1/00* (2006.01)
*B60R 22/48* (2006.01)
*B60R 22/18* (2006.01)
*B60R 1/00* (2006.01)

(52) U.S. Cl.
CPC ............... *B60R 22/48* (2013.01); *B60R 22/18* (2013.01); *B60R 1/00* (2013.01); *B60R 2225/00* (2013.01)

(58) Field of Classification Search
CPC .............................. B60R 1/00; B60R 2225/00
See application file for complete search history.

(56) References Cited

U.S. PATENT DOCUMENTS

| | | | |
|---|---|---|---|
| 5,431,446 A * | 7/1995 | Czarnecki | B60R 22/03 280/802 |
| 6,193,275 B1 | 2/2001 | Knox | |
| 6,883,834 B2 | 4/2005 | Grabowski et al. | |
| 7,686,338 B2 | 3/2010 | Dallwig et al. | |
| 2003/0200019 A1 * | 10/2003 | Grabowski | B60R 22/03 701/45 |
| 2005/0030188 A1 * | 2/2005 | Flanagan | B60R 99/00 340/667 |
| 2007/0282505 A1 * | 12/2007 | Bolton | B60R 22/02 701/45 |
| 2012/0235512 A1 * | 9/2012 | Siciliano | H01H 11/0062 307/112 |
| 2013/0187373 A1 | 7/2013 | Chang et al. | |

FOREIGN PATENT DOCUMENTS

GB    2445148    2/2008

* cited by examiner

*Primary Examiner* — Shirley Lu
(74) *Attorney, Agent, or Firm* — Frank A. MacKenzie; Bejin Bieneman PLC

(57) ABSTRACT

A vehicle system includes a seat belt buckle configured to receive a seat belt. The seat belt buckle is moveable between a first position and a second position. A timer is configured to determine an amount of time that the seat belt buckle is in the second position. If the seat belt buckle is in the second position for longer than a predetermined amount of time, the timer outputs an alert signal representing a potential fault.

20 Claims, 2 Drawing Sheets

SEAT BELT PRESENTER FAULT INDICATION

BACKGROUND

Seat belt presenters move the seat belt buckle to a position that makes the seat belt buckle more accessible to an occupant. Typically, the seat belt buckle moves along a track and is driven by an electric motor. A limit switch is located at the end of the track. When the seat belt buckle reaches the end of the track, the limit switch is actuated to turn off the motor. The motor returns the seat belt buckle to its original position after the seat belt is plugged into the buckle. A limit switch is located at the beginning of the track. When the seat belt buckle reaches the beginning of the track, the limit switch is actuated to turn off the motor. The driver must be notified of any system faults which affect the safety system, which is typically accomplished through the vehicle's diagnostic communication bus. Error reports on this bus are accepted by the vehicle's electronic controller, which in turn provides an audible and/or visual warning to the driver. This requires all safety components to have their own microprocessor for communicating system status to the vehicle via the diagnostic bus.

DETAILED DESCRIPTION

A fault in a seat belt presenter system may occur when the seat belt buckle does not move back to its original position. The vehicle occupant may not immediately recognize the fault, which could limit the seat belt's effectiveness. An example seat belt presenter system that alerts the occupant of the fault without using the vehicle diagnostic bus, and therefore, without a microprocessor, includes a seat belt buckle and a timer. The seat belt buckle is configured to receive a seat belt and is moveable between at least two positions—a first position and a second position. The timer determines the amount of time that the seat belt buckle takes to move from the second position back to the first position. If the seat belt buckle does not return to the first position for longer than a predetermined amount of time, which may occur if a motor is unable to bring the seat belt buckle back to the first position, the timer outputs an alert signal representing a potential fault. The alert signal may cause an audible alert, a haptic alert, or a visual alert. The system, therefore, notifies the occupant of the potential fault.

The elements shown may take many different forms and include multiple and/or alternate components and facilities. The example components illustrated are not intended to be limiting. Indeed, additional or alternative components and/or implementations may be used.

Figure 1:
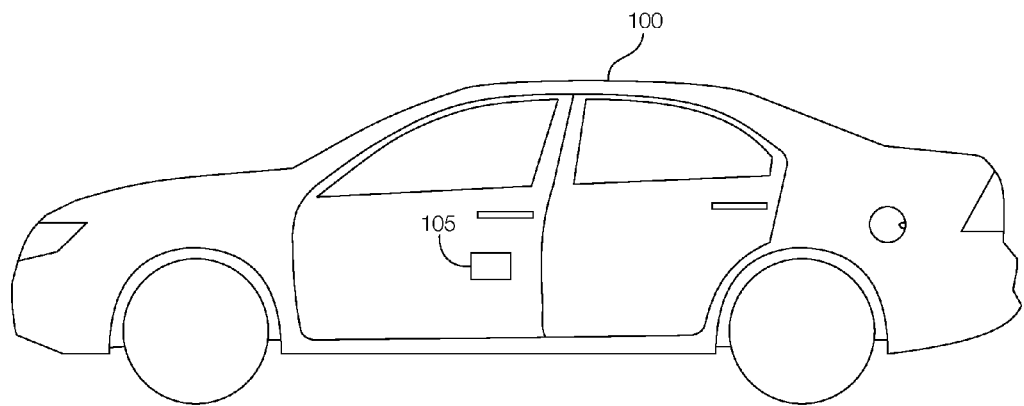
FIG. 1 illustrates an example vehicle with a seat belt presenter system.

As illustrated in FIG. 1, the vehicle 100 includes a seat belt presenter system 105. As discussed in greater detail below, the seat belt presenter system 105 moves a seat belt buckle 110 (see FIG. 2) between a first position 145 and a second position 150 (see FIG. 2). When in the second position 150, the seat belt buckle 110 is more accessible to the occupant. That is, the second position 150 is a more convenient position for the occupant to buckle the seat belt. During operation of the vehicle 100, however, and after the seat belt has been buckled, the seat belt buckle 110 should be moved back to the first position 145 to increase protection to the occupant. The seat belt presenter system 105 is configured to determine the amount of time the seat belt buckle 110 takes to travel from the second position 150 to the first position 145 and outputs an alert signal if the seat belt buckle 110 does not reach the first position 145 in a predetermined amount of time. This way, the seat belt presenter system 105 may help notify the occupant of a potential fault associated with the seat belt presenter system 105.

Although illustrated as a sedan, the vehicle 100 may include any passenger or commercial automobile such as a car, a truck, a sport utility vehicle, a crossover vehicle, a van, a minivan, a taxi, a bus, etc. In some possible approaches, the vehicle 100 is an autonomous vehicle configured to operate in an autonomous (e.g., driverless) mode, a partially autonomous mode, and/or a non-autonomous mode.

Figure 2:
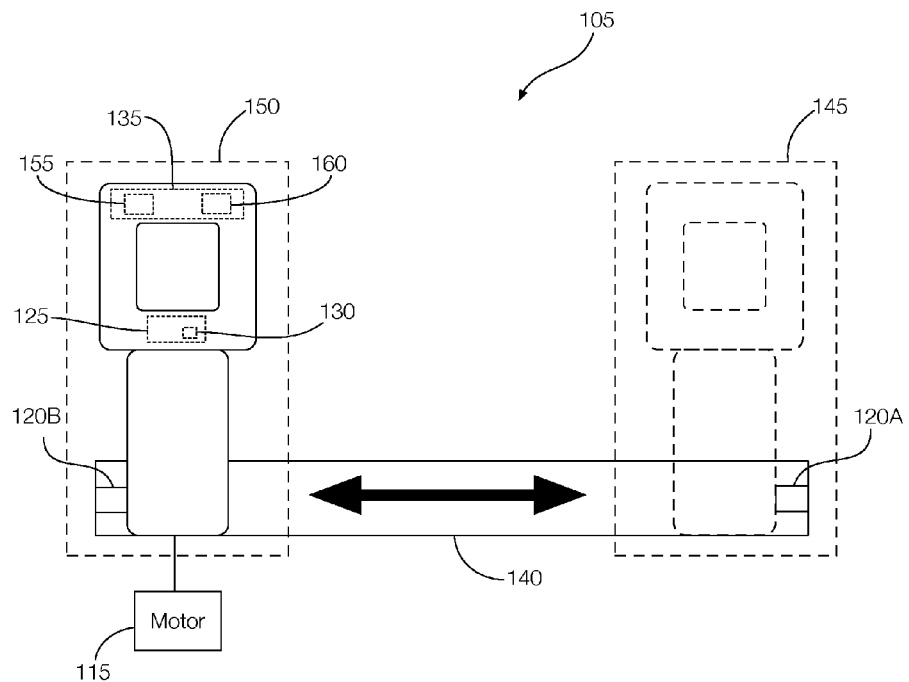
FIG. 2 illustrates example components of the seat belt presenter system with a fault indicator.

FIG. 2 illustrates example components of the seat belt presenter system 105 with a fault indicator. The seat belt presenter system 105, as shown, includes a seat belt buckle 110, a motor 115, a first limit switch 120A at the first position 145, a second limit switch 120B at the second position 150, a timer 125, and an alarm module 135.

The seat belt buckle 110 may be configured to receive a seat belt tongue (not shown). In some instances, the seat belt buckle 110 may include a button to release the tongue. One end of the seat belt buckle 110 may be attached to a seat or other structure inside the vehicle 100. The seat belt buckle 110 may be configured to move along a track 140. The movement of the seat belt buckle 110 may be facilitated by the motor 115.

The motor 115 may be configured to convert electrical energy from, e.g., a power source, into rotational movement. The motor 115 may include an output shaft configured to move the seat belt buckle 110 along the track 140 from the first position 145 to the second position 150, and from the second position 150 back to the first position 145. The motor 115 may be configured to move the seat belt buckle 110 from the first position 145 to the second position 150 when, e.g., the occupant opens a door to the vehicle 100 or when the vehicle 100 is turned on. The motor 115 may be configured to move the seat belt buckle 110 back to the first position 145 after the seat belt buckle 110 receives the seat belt tongue.

Limit switches 120A and 120B (collectively, 120) may be disposed at different ends of the track 140 near, e.g., the first position 145 and second position 150. The limit switches 120 may be configured to detect when the seat belt buckle 110 is in the first position 145 or second position 150. When the seat belt buckle 110 is in the first position 145, the seat belt buckle 110 may physically engage the first limit switch 120A, causing the first limit switch 120A to output a signal indicating the presence of the seat belt buckle 110 in the first position 145. When the seat belt buckle 110 is in the second position 150, the seat belt buckle 110 may physically engage the second limit switch 120B, causing the second limit switch 120B to output a signal indicating the presence of the seat belt buckle 110 in the second position 150. In implementations where the seat belt buckle 110 only moves between the first and second positions 145, 150—that is, the seat belt buckle 110 is not configured to stop at any intermediate positions—a single limit switch 120 may be used to determine whether the seat belt buckle 110 has left the first position 145 or the second position 150. In other words, the absence of the signal indicating the presence of the seat belt buckle 110 in the first position 145 may indicate that the seat belt is in the second position 150 or moving between the first and second positions 145, 150.

The timer 125 may include an electronic device, such as an integrated circuit, configured to determine the amount of time the seat belt buckle 110 takes to travel to the first position 150. If the seat belt buckle 110 is not in the first second position 145 after leaving the second position 150 for longer than a predetermined amount of time, the timer 125 may output an alert signal. To determine the amount of time the seat belt buckle 110 takes to travel to the first position 145, the timer 125 may include a counter 130. The counter 130 may be configured to begin a count that increases at regular intervals. The count may begin when the seat belt buckle 110 first begins to move from the second position 145 to the first position 150. For instance, the absence of the signal output by the limit switch 121 may cause the timer 125 to begin counting. The timer 125 may cease the count when the seat belt buckle 110 returns to the first position 145 from the second position 150. That is, the timer 125 may case counting when the limit switch 120 is activated.

As discussed above, the timer 125 may be configured to compare the count to a predetermined amount of time. The predetermined amount of time may be based on an amount of time sufficient for the seat belt buckle 110 to move from the second position 150 to the first position 145. This time can be determined from the power at the motor, the gearing of the motor shaft to the belt buckle 110, and the distance of the track 140. If the elapsed time, as determined from the count, exceeds the predetermined amount of time, the timer 125 may output the alert signal. The alert signal may be transmitted to the alarm module 135.

The alarm module 135 can be included in the buckle system to avoid adding a microprocessor to the buckle presenter system 105. The alarm module 135 may include an audio module 155, a light module 160, or both, configured to receive the alert signal. In response to receiving the alert signal, the audio module 155 may output an audible sound to alert the occupant of the potential fault in the seat belt presenter system 105. Accordingly, the audio module 155 may include, e.g., a piezoelectric buzzer or other sound-generating device. Some audio modules 155 may be further configured to provide a haptic alert to the occupant. For instance, a piezoelectric buzzer may vibrate. The occupant may feel such vibration on his or her hip or leg, alerting the occupant of the potential fault. In addition or in the alternative, the light module 160 may illuminate in response to receiving the alert signal. Thus, the occupant may be provided with a visual alert indicating the potential fault. The light module 160, therefore, may include one or more light emitting diodes.

Figure 3:
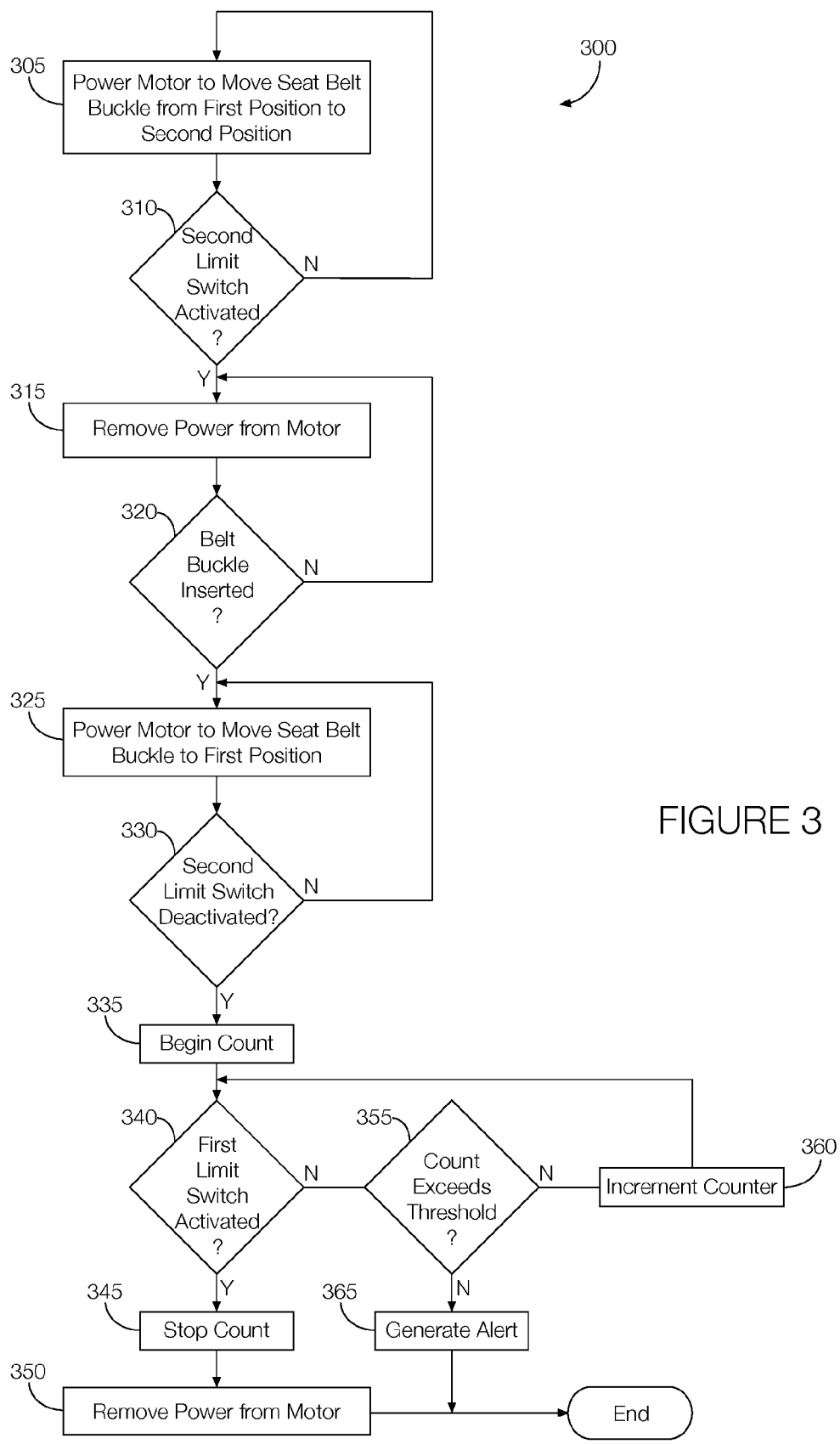
FIG. 3 is a flowchart of an example process that may be executed by the seat belt presenter system of FIGS. 1 and 2.

FIG. 3 is a flowchart of an example process 300 that may be executed by the seat belt presenter system 105. The process 300 may be initiated when, e.g., a door is opened or any time a passenger is likely to enter or exit the vehicle 100.

At block 305, the system 105 may apply power to the motor 115 to move the seat belt buckle 110 from a first position 145 to a second position 150. The first position 145 may include the position of the seat belt buckle 110 during normal operation of the vehicle 100. For instance, the first position 145 may include a position near a rear of the seat. The second position 150 may include a position that allows a passenger to easily access the seat belt buckle 110. For instance, the second position 150 may be toward the center or front of the seat.

At block 310, the system 105 may determine if the limit switch 120B at the second position 150 has been activated. If not, the system 105 may continue to apply power to the motor. If the limit switch 120B in the second position 150 has been activated, the system 105 may remove power from the motor 115 (see block 315).

At decision block 320, the system 105 may determine if the seat belt tongue is inserted in the seat belt buckle 110. If not, the process 300 may continue at block 315. If the result of decision block 320 is affirmative, the process 300 may progress to block 325 where power may be applied to the motor 115 to move the buckle 110 back to the first position 145.

At block 330, the system 105 may determine if the limit switch 120B at the second position 150 has been deactivated. If not, the process 300 may return to block 325 to continue applying power to the motor 115. After the limit switch 120B at the second position 150 is deactivated, the timer 125 may begin a count that increases at regular intervals, as shown at block 335. The count may begin when the seat belt buckle 110 first begins to move from the first position 145 to the second position 150. For instance, the deactivation of the limit switch 120A may cause the timer 125 to begin counting. When the seat belt buckle 110 activates the limit switch 120A at the first position 145 at block 340, the system stops the count as shown at block 345 and removes power from the motor as shown at block 350. After removing power from the motor the process 300 may end.

Returning to decision block 340, if the limit switch 120A at the first position 145 has not been activated, the process 300 may proceed at block 355, where the counter is compared to a predetermined amount of time or number of iterations. The predetermined amount of time may be based on an amount of time sufficient for the seat belt buckle 110 to move from the first position 145 to the second position 150, an occupant to enter the vehicle 100, the seat belt buckle 110 to receive the seat belt tongue, and for the seat belt buckle 110 to return from the second position 150 to the first position 145. Besides time, the value may be based on, e.g., a number of iterations including the number of times block 340 is executed. If the count exceeds the predetermined amount of time or iterations, the process 300 may proceed to block 365, whereupon the system 105 may generate an alarm indicating an error to the operator. Otherwise, the process 300 may continue with block 360. That is, the system 105 may increment the counter and return to block 340 to query the limit switch 120A in the first position 145. After generating the alarm in block 365, the process 300 may end.

In general, the computing systems and/or devices described may employ any of a number of computer operating systems, including, but by no means limited to, versions and/or varieties of the Ford Sync® operating system, the Microsoft Windows® operating system, the Unix operating system (e.g., the Solaris® operating system distributed by Oracle Corporation of Redwood Shores, Calif.), the AIX UNIX operating system distributed by International Business Machines of Armonk, N.Y., the Linux operating system, the Mac OSX and iOS operating systems distributed by Apple Inc. of Cupertino, Calif., the BlackBerry OS distributed by Blackberry, Ltd. of Waterloo, Canada, and the Android operating system developed by Google, Inc. and the Open Handset Alliance. Examples of computing devices include, without limitation, an on-board vehicle computer, a computer workstation, a server, a desktop, notebook, laptop, or handheld computer, or some other computing system and/or device.

Computing devices generally include computer-executable instructions, where the instructions may be executable by one or more computing devices such as those listed above. Computer-executable instructions may be compiled or interpreted from computer programs created using a variety of programming languages and/or technologies, including, without limitation, and either alone or in combination, Java™, C, C++, Visual Basic, Java Script, Perl, etc. In general, a processor (e.g., a microprocessor) receives instructions, e.g., from a memory, a computer-readable medium, etc., and executes these instructions, thereby performing one or more processes, including one or more of the processes described herein. Such instructions and other data may be stored and transmitted using a variety of computer-readable media.

A computer-readable medium (also referred to as a processor-readable medium) includes any non-transitory (e.g., tangible) medium that participates in providing data (e.g., instructions) that may be read by a computer (e.g., by a processor of a computer). Such a medium may take many forms, including, but not limited to, non-volatile media and volatile media. Non-volatile media may include, for example, optical or magnetic disks and other persistent memory. Volatile media may include, for example, dynamic random access memory (DRAM), which typically constitutes a main memory. Such instructions may be transmitted by one or more transmission media, including coaxial cables, copper wire and fiber optics, including the wires that comprise a system bus coupled to a processor of a computer. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, or any other medium from which a computer can read.

Databases, data repositories or other data stores described herein may include various kinds of mechanisms for storing, accessing, and retrieving various kinds of data, including a hierarchical database, a set of files in a file system, an application database in a proprietary format, a relational database management system (RDBMS), etc. Each such data store is generally included within a computing device employing a computer operating system such as one of those mentioned above, and are accessed via a network in any one or more of a variety of manners. A file system may be accessible from a computer operating system, and may include files stored in various formats. An RDBMS generally employs the Structured Query Language (SQL) in addition to a language for creating, storing, editing, and executing stored procedures, such as the PL/SQL language mentioned above.

In some examples, system elements may be implemented as computer-readable instructions (e.g., software) on one or more computing devices (e.g., servers, personal computers, etc.), stored on computer readable media associated therewith (e.g., disks, memories, etc.). A computer program product may comprise such instructions stored on computer readable media for carrying out the functions described herein.

With regard to the processes, systems, methods, heuristics, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating certain embodiments, and should in no way be construed so as to limit the claims.

Accordingly, it is to be understood that the above description is intended to be illustrative and not restrictive. Many embodiments and applications other than the examples provided would be apparent upon reading the above description. The scope should be determined, not with reference to the above description, but should instead be determined with reference to the appended claims, along with the full scope of equivalents to which such claims are entitled. It is anticipated and intended that future developments will occur in the technologies discussed herein, and that the disclosed systems and methods will be incorporated into such future embodiments. In sum, it should be understood that the application is capable of modification and variation.

All terms used in the claims are intended to be given their ordinary meanings as understood by those knowledgeable in the technologies described herein unless an explicit indication to the contrary is made herein. In particular, use of the singular articles such as "a," "the," "said," etc. should be read to recite one or more of the indicated elements unless a claim recites an explicit limitation to the contrary.

The Abstract is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

The invention claimed is:

1. A vehicle system comprising:
a seat belt buckle configured to receive a seat belt and wherein the seat belt buckle is moveable along a track between a first position and a second position; and
a timer configured to determine an amount of time the seat belt buckle is in the second position and output an alert signal if the seat belt buckle is in the second position for longer than a predetermined amount of time.

2. The vehicle system of claim 1, wherein the timer includes a counter configured to determine the amount of time the seat belt buckle is in the second position.

3. The vehicle system of claim 1, further comprising a motor configured to move the seat belt buckle from the first position to the second position.

4. The vehicle system of claim 3, wherein the motor is configured to move the seat belt buckle from the second position to the first position.

5. The vehicle system of claim 1, wherein the timer is configured to begin counting when the seat belt buckle begins to move from the first position to the second position.

6. The vehicle system of claim 1, wherein the timer is configured to cease counting when the seat belt buckle returns to the first position.

7. The vehicle system of claim 1, further comprising an alarm module configured to receive the alert signal and output at least one of an audible alert, a haptic alert, and a visual alert in response to receiving the alert signal.

8. The vehicle system of claim 7, wherein the alarm module includes at least one light emitting diode.

9. The vehicle system of claim 7, wherein the alarm module includes a piezoelectric buzzer.

10. A vehicle system comprising:
a seat belt buckle configured to receive a seat belt and moveable, along a track, between a first position and a second position;

a motor configured to move the seat belt buckle from the first position to the second position;

a timer configured to determine an amount of time the seat belt buckle is in the second position and output an alert signal if the seat belt buckle is in the second position for longer than a predetermined amount of time; and an alarm module configured to receive the alert signal and output an alert in response to receiving the alert signal.

11. The vehicle system of claim 10, wherein the timer includes a counter configured to determine the amount of time the seat belt buckle is in the second position.

12. The vehicle system of claim 10, wherein the motor is configured to move the seat belt buckle from the second position to the first position.

13. The vehicle system of claim 10, wherein the timer is configured to begin counting when the motor begins to move the seat belt buckle from the first position to the second position.

14. The vehicle system of claim 10, wherein the timer is configured to cease counting when the seat belt buckle returns to the first position.

15. The vehicle system of claim 10, wherein the alarm module is configured to output at least one of an audible alert and a haptic alert in response to receiving the alert signal.

16. The vehicle system of claim 15, wherein the alarm module includes a piezoelectric buzzer.

17. The vehicle system of claim 10, wherein the alarm module is configured to output a visual alert in response to receiving the alert signal.

18. The vehicle system of claim 7, wherein the alarm module includes at least one light emitting diode.

19. A method comprising:
moving a seat belt buckle along a track from a first position to a second position;
determining an amount of time the seat belt buckle is in the second position;
comparing the amount of time the seat belt buckle is in the second position to a predetermined amount of time; and
generating an alert signal if the seat belt buckle is in the second position longer than the predetermined amount of time.

20. The method of claim 19, wherein the amount of time the seat belt buckle is in the second position is based on when the seat belt buckle begins to move from the first position to the second position and when the seat belt buckle returns to the first position.

* * * * *